J. R., D. W. & J. PERRY.
Car Truck.
No. 104,762.
Patented June 28, 1870.
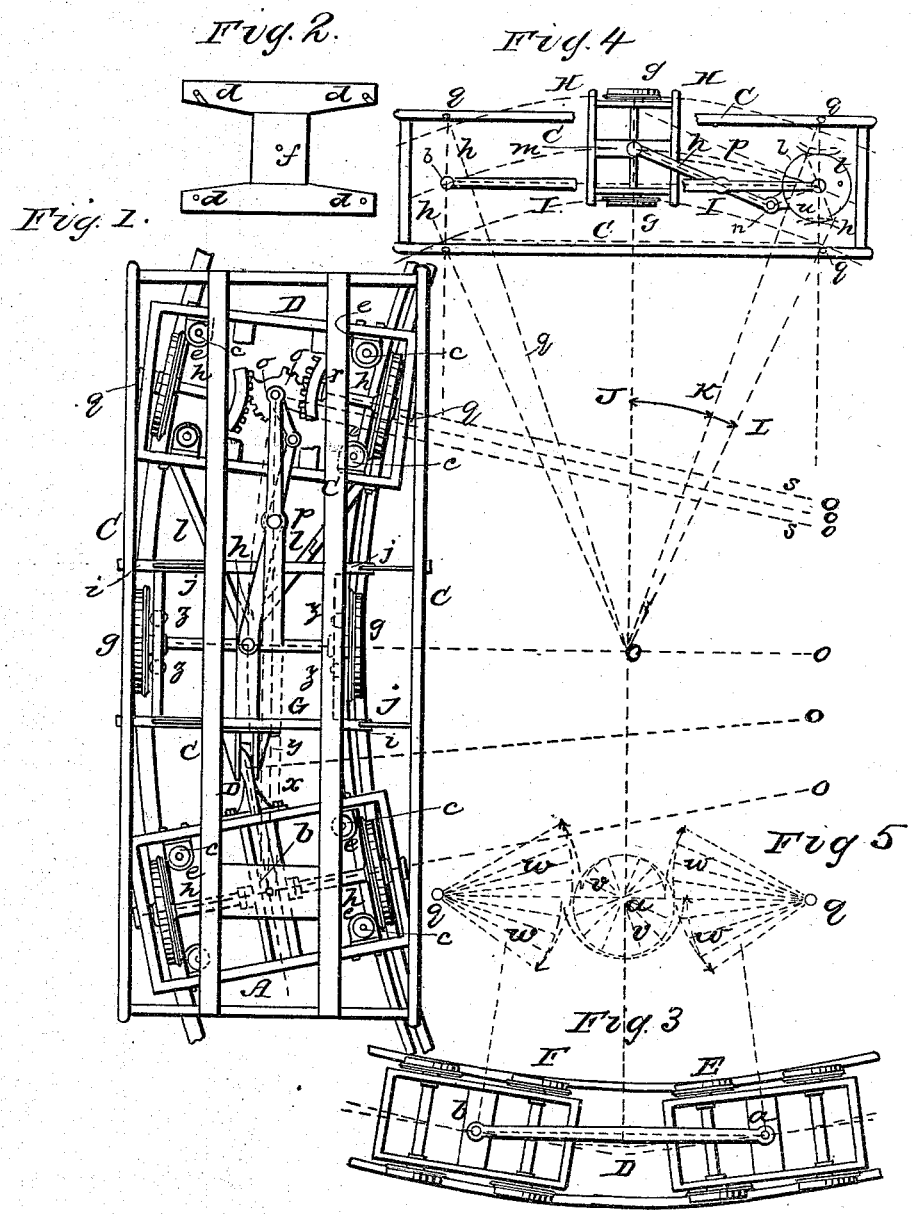
WITNESSES
INVENTOR
Joseph R. Perry
Daniel W. Perry
James Perry

UNITED STATES PATENT OFFICE.

JOSEPH R. PERRY, DANIEL W. PERRY, AND JAMES PERRY, OF WILKES-BARRÉ, PENNSYLVANIA.

IMPROVED STREET-RAILWAY-CAR TRUCK.

Specification forming part of Letters Patent No. 104,762, dated June 28, 1870.

*To all whom it may concern:*

Be it known that we, JOSEPH R. PERRY, DANIEL W. PERRY, and JAMES PERRY, of Wilkes-Barré, in the county of Luzerne and State of Pennsylvania, have invented a new and useful Improvement in the Running-Gear of Street-Railway Cars; and we do hereby declare that the following is a full, clear, and exact description of the same, reference being had to the accompanying drawings, which make a part of this specification, and to the letters and figures marked thereon.

The object of our invention is to provide additional points of support for the purpose of sustaining a portion of the weight of the car and its load, and a point of resistance or fulcrum for the purpose of deflecting the axles and wheels of a street-railway car.

Our invention has for its object the extension of the base of a street-car, or, in other words, placing the forward and rear sets of divided axles a greater distance apart than can be done with non-deflecting axles on curves of short radii, and increasing the number of points upon which the car rests, and producing a flexible running-gear; and the invention consists in combining with the said sets o axles a laterally-moving truck composed mainly of a pair of flange-wheels mounted on a single or divided axle, and a frame; and in so connecting said laterally-moving truck with the car-body, and also with a truck at each side of it, as to deflect the latter, with its axles and wheels to any required angle in passing over a curve in a railway; and in so connecting such laterally-moving truck with the car-body and with a pair of short axles pivoted to the sides of the car-body as to deflect the said axles to any required angle in passing over a curve in a railway; and in arranging the said laterally-moving truck in such manner as to produce unequal angular deflections of the said short axles, and cause them to point to a common center at or near the center of all the curves of the track.

In the accompanying drawings the same letters of reference indicate like parts in all the figures.

Figure 1 is a plan view of two truck-frames, A B, connected with the bottom framing, C, of the car-body by the center bolts, $a$ and $b$, all the points of which are in the position which they must necessarily assume while standing or moving on a curved track. Fig. 2 is an inverted view of a bolster, which is to be placed upon the springs $c$ of the trucks A and B immediately under the car-body. The guide-rods $d$ pass through the said springs, and their supports $e$ beneath them, and one of the center bolts, $a$ or $b$, passes through the hole $f$ of each bolster. Fig. 3 is a plan view of two four-wheeled trucks standing on a curved track, which is introduced for the purpose of showing the effect of and the necessity for deflecting the axles and wheels of a six-wheeled street-car. Fig. 4 is a plan view, introduced to illustrate the principle of the mechanism which produces the unequal angular deflections of the end wheels and axles of a car, for the purpose of making the said axles point to a common center, as at O. Fig. 5 is a diagram, which further illustrates the said principle of Fig. 4 as to its general application for producing the variable angular deflections of the said wheels and axles, to the end that the latter may be made to point to a common center at or near to the center of curvature of all curves of a track.

Referring to Fig. 3, it will be seen that the tangent-lines $a$ D $b$ D form equal angles with the chord or bar $a b$, which, from the nature of the circle and construction of the trucks, remain constant for all parts of the same curve on which the trucks move. If, however, the flanges of either or both pairs of wheels E F were removed, this equality and constancy of the angles $a b$ D and $b a$ D could not obtain, for the reason that the point or points of resistance which these flanges secure against the rails would be wanting, and therefore no useful effect could be obtained from such an arrangement. If, however, either pair of said wheels were brought to the center D and secured to both truck-frames in such manner as to keep the axis of the axle coincident with the radius D O, both trucks would be confined to the curve, and they would tend to follow the track with equal facility and security, as is afforded by the system of four-wheeled trucks. It is therefore evident that a single pair of flange-wheels placed between and geared to operate with two other pairs is sufficient to deflect the truck-frames and their wheels, or the axles and wheels, so as to make a six-wheeled car describe curves of small radii with great ease, celerity, and security.

Referring now to Fig. 1, it will be seen in what manner the intermediate pair of wheels,

*g*, which are fitted to the transverse frame G, are made to deflect the truck-frames A and B and their axles *h*. The transverse frame G is attached to the beams C by the sleeves *i*, which move laterally on the bars *j*, as occasion requires, and as the lever *k* and brace-bars *l* are both articulated to the center plate, *m*, of the transverse frame they are both moved laterally in the same direction with the frame G, the effect of which is the deflection of the truck-frame B through the angle *m a b*, which in this instance is one-fourth of the angle subtended by the chord *a b* at the center of the curve. Simultaneously with the aforesaid lateral movement of the parts G *l k* the other end of the lever *k*, which is articulated to the arm *n* of the pinion *o* and to the bar *a b* at *p*, moves in the opposite direction, and thereby moves the said arm and pinion, so as to further deflect the axles *h* of the frame B toward the center O of the curved track, this deflection of said axles being made practicable by reason of the construction and attachment of the pivot-boxes *q* and the segmental arcs *r* to the said frame B. For curves of large radii it is not necessary that the lines *r s r s* of the axles *h* should point to a common center, as at O, Fig. 4; but for curves of short radii—such as are common to street-railway tracks—this is essentially necessary to secure freedom from friction, abrasion, and torsion of the running-gear; and to secure this end we introduce Figs. 4 and 5 to illustrate the principle and modes of constructing the mechanism to obtain this requisite result.

In Fig. 4 the pinion *o* is moved by precisely the same parts and combination as just described with respect to truck B, Fig. 1, except the brace *l* thereof; but the direction of the axles *h*, which are here represented as pivoted to the bottom beams, C, of the car-body point to the common center O of the track, which is composed of the concentric arcs H and I; and it is obvious from an inspection of Fig. 4 that the angle J O K, which measures the deflection of the axle and wheel on the outside rail, H, is less than the angle J O L, which measures the deflection of the axle and wheel on the inside rail, I, and therefore it is necessary that the lateral movement of the transverse frame G, produced by the pressure of the wheels *g* against the rail I, should be so related to the angular deflections of the axles and wheels which move on both inside and outside rails of a curve as to effect the required degrees of deflection, which are necessary to make the axles of both sets point to the common center O of the curve. This may be done for a given curve by dividing the lines *a q a q* into parts which shall have the inverse ratio of the required angles of deflection of the axles to the angle of deflection of the arm *n*, as represented by the circular pitch-lines *t u* of the pinion *o* and axles *h q h q*, Fig. 4; but to adapt the principle to the conditions required, to cause all the axles to point to the center of all the curves of a track it is necessary to make the pitch-lines of both pinion *o* and segments *r* eccentric arcs—the radii vector *v w*, Fig. 5, to be so proportioned as to fulfil the aforesaid required conditions which the different curves of a track, the length of chord, or distance apart of axles *a* to *b*, may re-require.

Recurring to Fig. 1, it will be seen that the truck-frame A is articulated to the transverse frame G by the castings *x y*, which are made sufficiently deep at their points of contact to permit the springs *c z* of the said frames to move unrestrained by the said means of articulation.

It will also be seen that the truck-frame A is deflected to the extent of the tangential angle D *b a*, which is equal to one-half of the angle subtended by the chord *a b* at the center of the curve, and hence the axles *h* of this frame point to the center O of the curve on which the car stands; and this will be the case with respect to the truck A on all curves, so long as its connection with the laterally-moving frame G is made at the point of intersection D of the equal tangents *b* D and *m* D of the arc *a m b*. The convergence of the axes of the axles to a common center is not of itself sufficient to cause a car to describe a given curve freely, unless the wheels can revolve independently of each other, and we therefore have shown the deflecting axles as divided and fitted to a journal-box at both ends in the three modes of their application; but the laterally-moving immediate pair of wheels *g* are represented as secured to a single axle, because, as we suppose, it will be found in general practice to be preferable to the substitution of the divided one. It is also to be understood that the bar *a b* shall not be applied in every case, as its equivalent is supplied by the car-body itself; but in street-cars the center-bolts are so near together that its application becomes easy and useful for connecting the running-gear together, and to strengthen the whole car.

Having thus fully set forth and described the object, nature, and mechanism of our improvements, what we claim as our invention, and desire to secure by Letters Patent of the United States, is as follows:

The combination of a laterally-moving truck, consisting, mainly, of a pair of wheels mounted on a single or divided axle, and a frame, with trucks of the construction of the truck B or of the construction of the truck A on one side, and of the construction of the truck B on the other side, for the purpose of extending the base on which the car rests, and of increasing the number of bearing-points, and of providing a flexible and easy-running gear, substantially as described.

JOSEPH R. PERRY.
DANIEL W. PERRY.
JAMES PERRY.

Witnesses:
VALENTINE STAGE,
C. A. ZIEGLER.